US011652541B1

(12) United States Patent
Yao et al.

(10) Patent No.: US 11,652,541 B1
(45) Date of Patent: May 16, 2023

(54) PHASE ARRAY ROUTING CONNECTIVITY

(71) Applicant: AST & Science, LLC, Miami, FL (US)

(72) Inventors: Huiwen Yao, Potomac, MD (US); Adam H. Halperin, Silver Spring, MD (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/171,711

(22) Filed: Feb. 9, 2021

Related U.S. Application Data

(60) Provisional application No. 62/975,007, filed on Feb. 11, 2020.

(51) Int. Cl.
 *H04B 7/185* (2006.01)
(52) U.S. Cl.
 CPC ..... *H04B 7/18526* (2013.01); *H04B 7/18513* (2013.01); *H04B 7/18519* (2013.01); *H04B 7/18541* (2013.01)
(58) Field of Classification Search
 None
 See application file for complete search history.

(56) References Cited

U.S. PATENT DOCUMENTS

| | | | |
|---|---|---|---|
| 6,321,268 B1* | 11/2001 | Dillon | H04L 69/168 709/217 |
| 9,973,266 B1 | 5/2018 | Avellan et al. | |
| 2002/0164981 A1* | 11/2002 | Parkman | H04B 7/18508 455/431 |
| 2017/0047987 A1* | 2/2017 | Pellegrino | H04L 27/261 |
| 2018/0376393 A1* | 12/2018 | Wu | H04L 5/26 |
| 2019/0238216 A1 | 8/2019 | Avellan et al. | |
| 2020/0361635 A1 | 11/2020 | Braun et al. | |
| 2020/0365966 A1 | 11/2020 | Honour et al. | |
| 2020/0366237 A1 | 11/2020 | Hernandez Bahlsen | |

\* cited by examiner

*Primary Examiner* — Shripal K Khajuria
(74) *Attorney, Agent, or Firm* — Botos Churchill IP Law

(57) ABSTRACT

A communication system has a control module with a control processing device, and a plurality of common modules. Each of the common modules has a common processing device. The control module and the plurality of common modules are connected with at least one adjacent common module to form a communication array. The control module and the common modules communicate via a first routing path having a first path of common modules of the plurality of common modules, and a second routing path having a second path of common modules of the plurality of common modules different than the first path of common modules. The control module and the plurality of common modules communicate via the second routing path when one of the first set of common modules fails.

14 Claims, 14 Drawing Sheets

PHASE ARRAY ROUTING CONNECTIVITY

CROSS-REFERENCE TO RELATED APPLICATIONS

This application claims the benefit of priority of U.S. Application No. 62/975,007, filed on Feb. 11, 2020. The entire content of that application is relied upon and incorporated herein by reference in its entirety.

BACKGROUND

U.S. Pat. No. 9,973,266 and U.S. Publ. No. 2019/0238216 show a system for assembling a large number of small satellite antenna assemblies in space to form a large array. The entire content of the '266 patent is incorporated herein by reference. As disclosed in the '266 Patent, FIGS. 1(a), 1(b) show a satellite communication system 100 having an array 300 of small satellites 302 and a central or control satellite 200. The small satellites 302 communicate with end users 500 within a footprint 400 on Earth, and also communicate with the control satellite 200, which in turn communicates with a gateway 600 at a base station. The small satellites 302 can each include, for example, a processing device (e.g., a processor or controller) and one or more antenna elements. And the control satellite 200 can include a processing device and one or more antenna or antenna elements.

SUMMARY

A communication system has a control satellite (also referred to herein as control module) having a control processing device, and a plurality of common modules. Each of the common modules has a common processing device. The control module and the plurality of common modules are connected to at least one adjacent common module to form a communication array. The control module and the plurality of common modules, each with a one or a plurality of connections with adjacent modules creating a web of connections. The control module and the plurality of common modules communicate via a routing path within the constraints of the web of connections and possible routing paths. The control module changing the routing path within the constraints of the web of connections to bypass failure of one or more components and/or modules.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
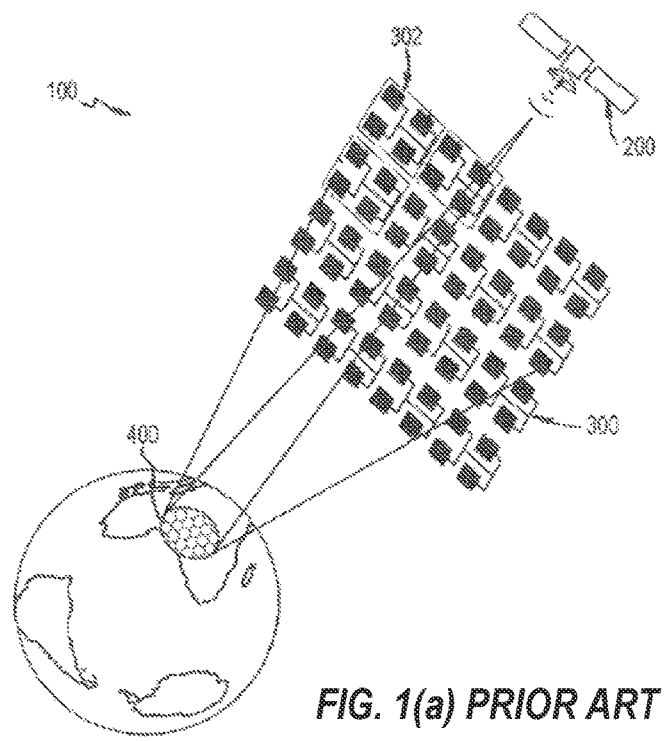
FIGS. 1(a), 1(b) show an array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the present disclosure are described for illustrative purposes, it being understood that the disclosure ay be embodied in other forms not specifically shown in the drawings.

The present disclosure provides a large satellite phased array system with distributed digital beam forming made up of a plurality of common modules. As shown in FIGS. 2(a), 2(b), 3(a)-3(d), the phased array contains a control satellite 200 and m common modules 20. Module n refers to an ambiguous module within m, Module n-1 refers to an ambiguous module within m that is physically adjacent to module n. The module count (m) refers to the number of common modules excluding the control satellite, so m=100 refers to 100 common modules +1 control satellite.

Figure 2A:
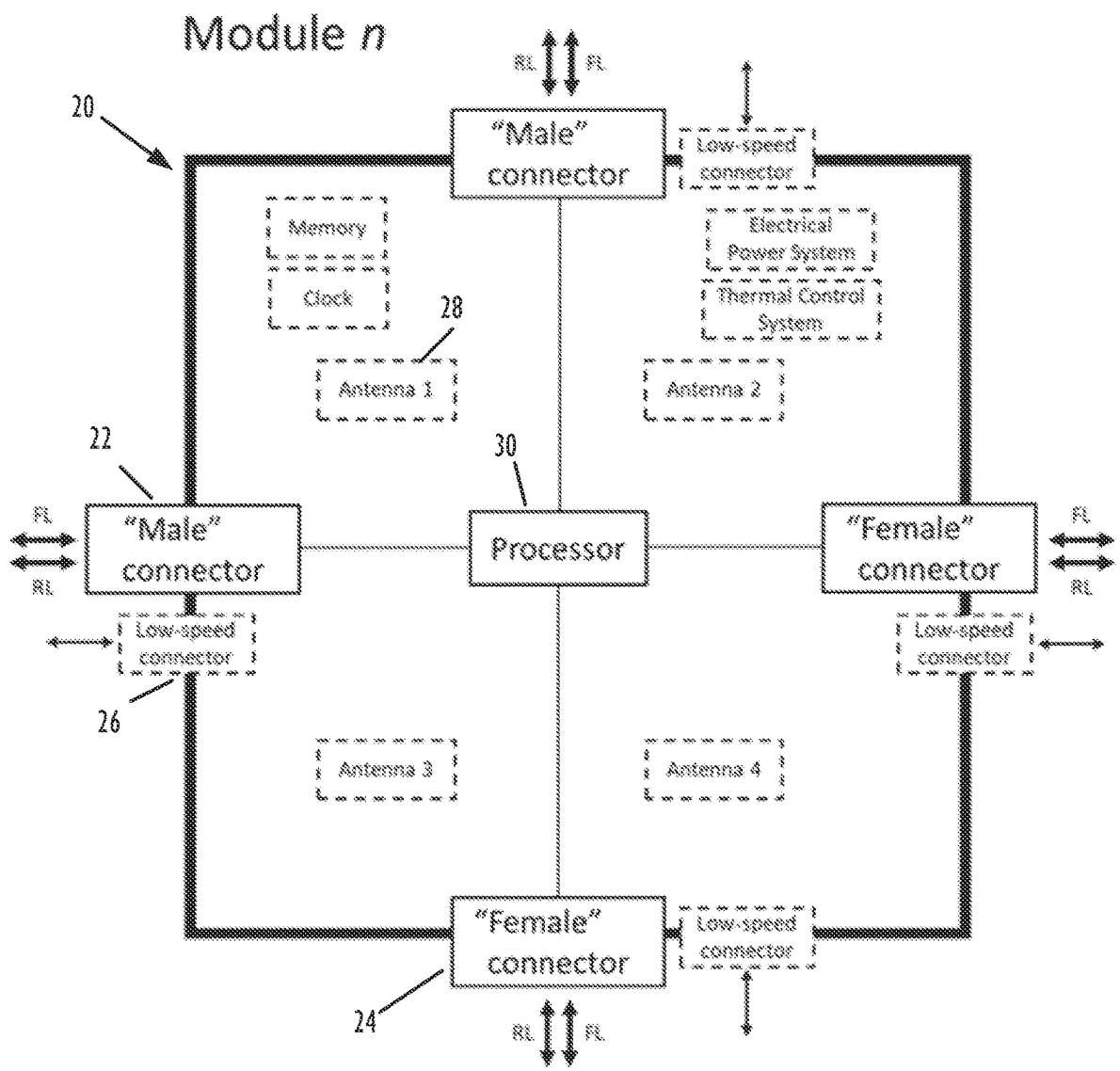
FIG. 2(a) is a block diagram of the module hardware.

Referring to FIG. 2(a), each common module 20 has a processing core 30, memory, antennas 28, electrical power system, and hardwire communications interfaces 22, 24, 26. The modules 20 are used in a coordinated fashion to function as a large aperture phased array in space. The array can be planar, or non-planar such as curved. The signal that any one module receives from Earth is not necessarily useful, but after the aggregation of the signal received by all modules, specific signals can be distinguished. This aggregation requires the signal information received by all modules to be processed by common module processors 30 and the control module processor 230 and is referred to as the Forward Link (FL). Thus, the FL is received by the processor 30, which performs the calculations necessary to send the forward link data across its antennas to the users on the ground, That exact same forward link information is passed on to adjacent modules for which the module in question is an intermediary. Conversely, any one module 20 is unable to send a signal of sufficient strength to Earth, and so their signals must be coordinated by the control satellite 200. This coordination requires that the control satellite 200 send information to each module 20 indicating how and when to excite their antennas 28 and is referred to as the Return Link (RL).

Figure 3A:
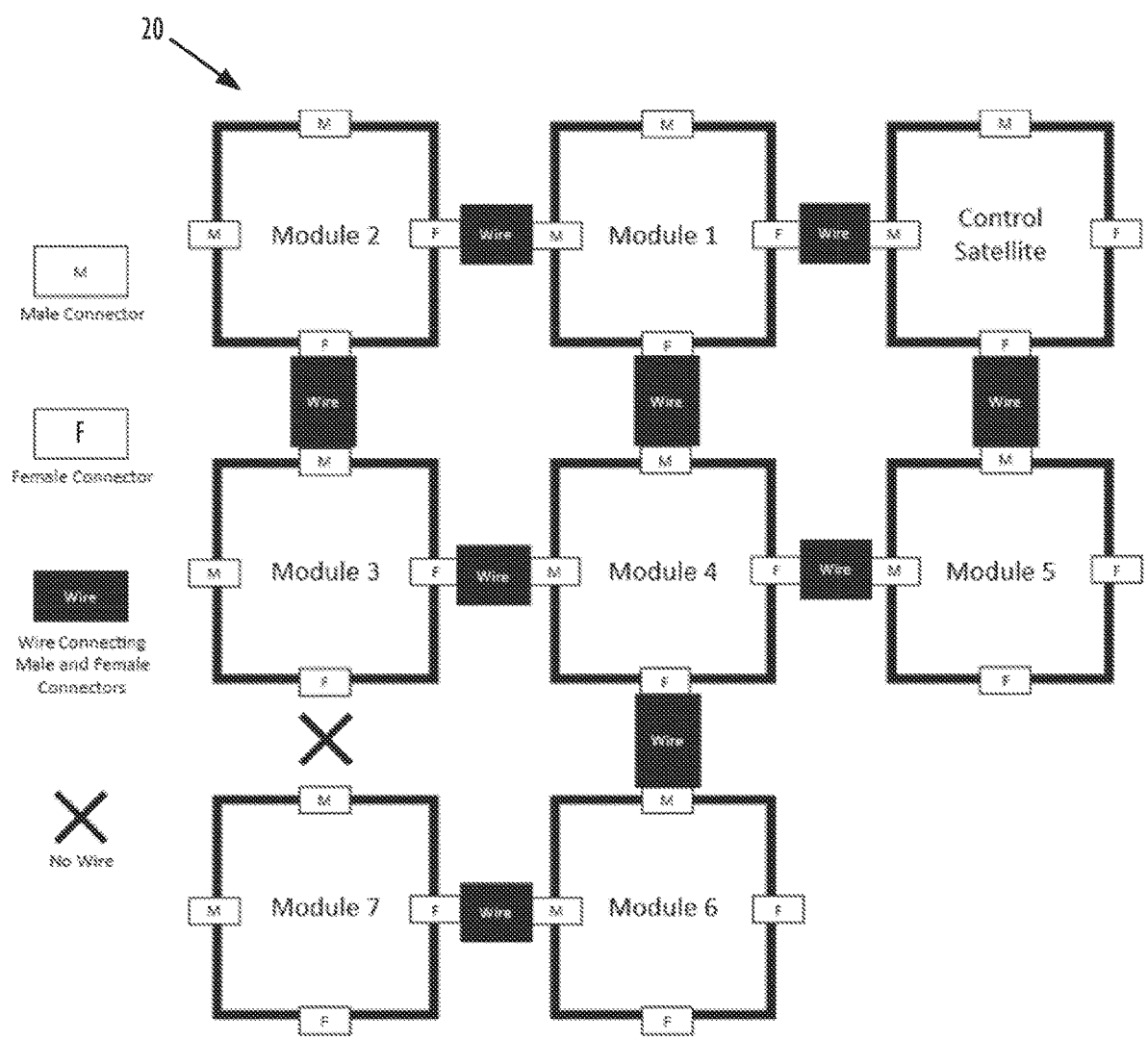
FIG. 3(a) is a block diagram of a control module and plurality of common modules connected by wires in one embodiment of the present disclosure.
Figure 4A:
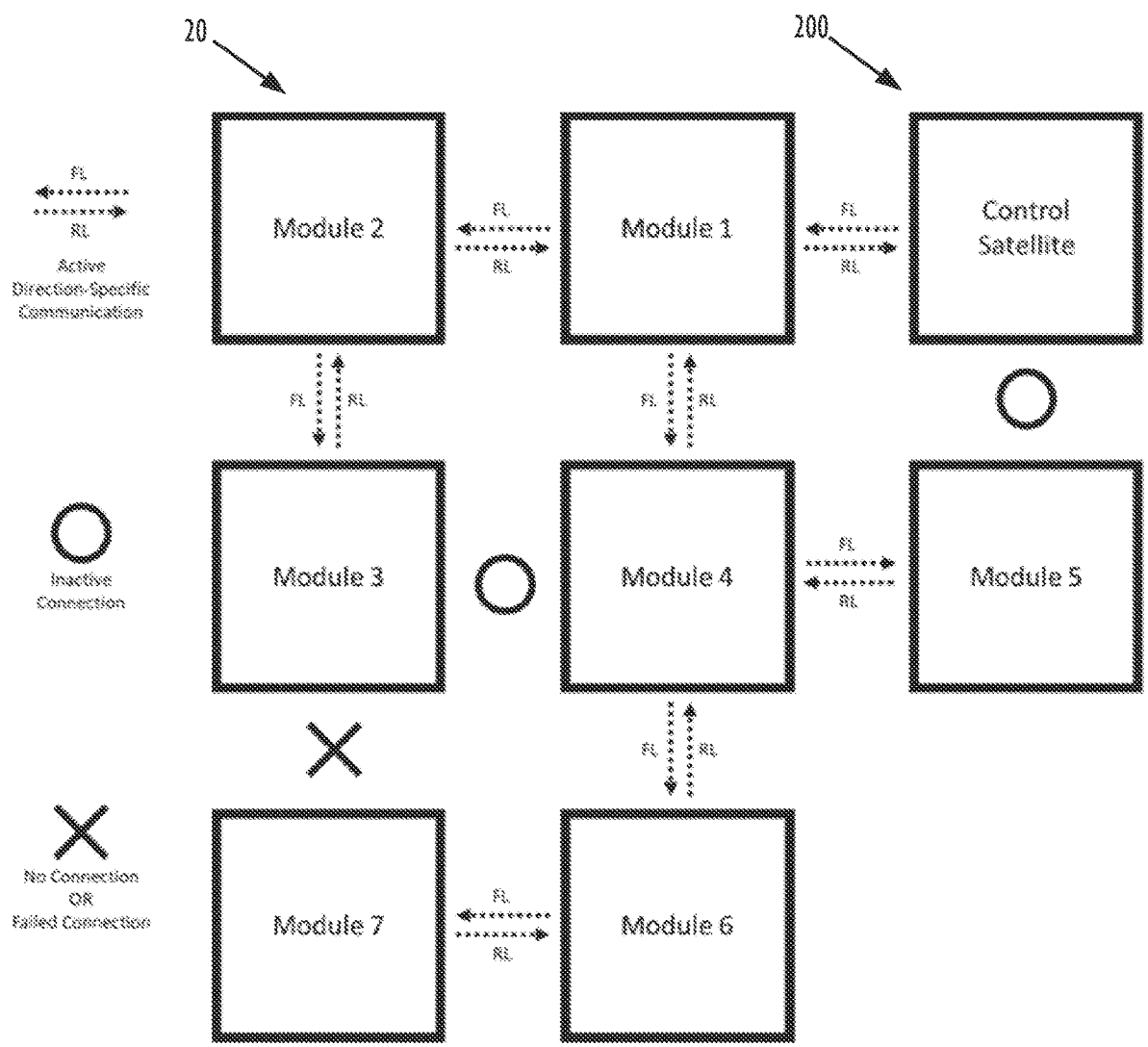
FIG. 4(a) is a block diagram of an example routing path within the web of connections of FIG. 3(b)

Thus, the common modules 20 are composed of many components, some of which are antennas or antenna elements 28, a processor 30, memory core, clock, electrical power system, thermal control system, one or more low-speed connectors 26, and one or more high-speed connectors 22, 24. As seen in FIG. 2(a), the connectors are male always male on two sides and female on the opposite sides, allowing adjacent modules to be connected male-to-female or female-to-male with wires as seen in FIG. 3(a). As seen in FIG. 4(a), communication of data across the high-speed connectors 22, 24 originating at the control satellite 200 and communication of data across the high-speed connectors bound for the control satellite 200 are referred to as Forward Link (FL) and Return Link (RL), respectively. Each common module 20 has at least one wire through which it can communicate RL and FL data with at least one adjacent module 20 or the control satellite 200. This communication could potentially be done wirelessly, but a wired connection is more suitable to handle the extremely high rate of data flow. The male and female connectors can be utilized for either FL or RL communication of data, though in one embodiment if a male (or female) connector is utilized for an FL output it is also being used as an RL input, and if it is used for an FL input it is also being used as an RL output.

Figure 1B:
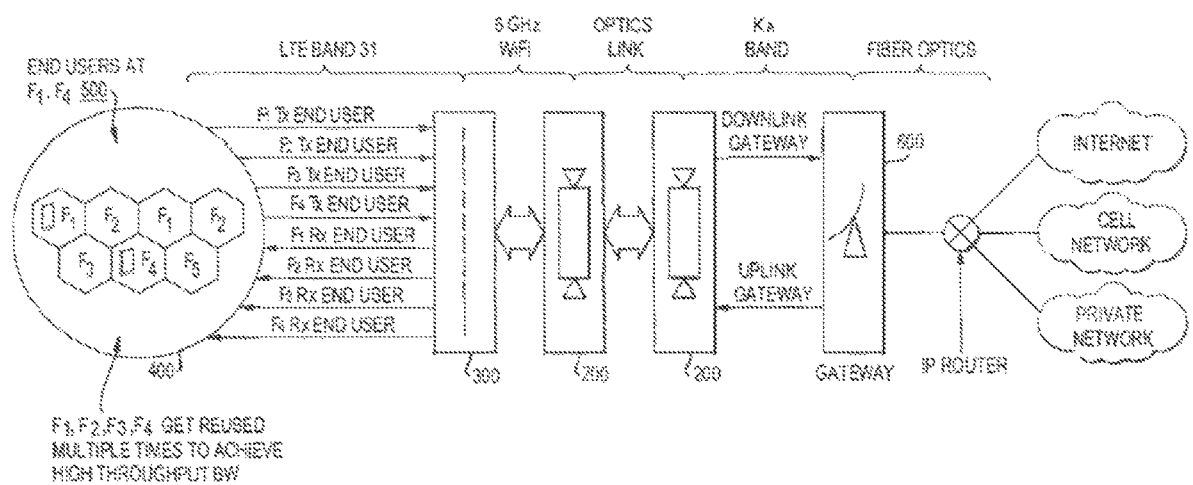
Figure 2B:
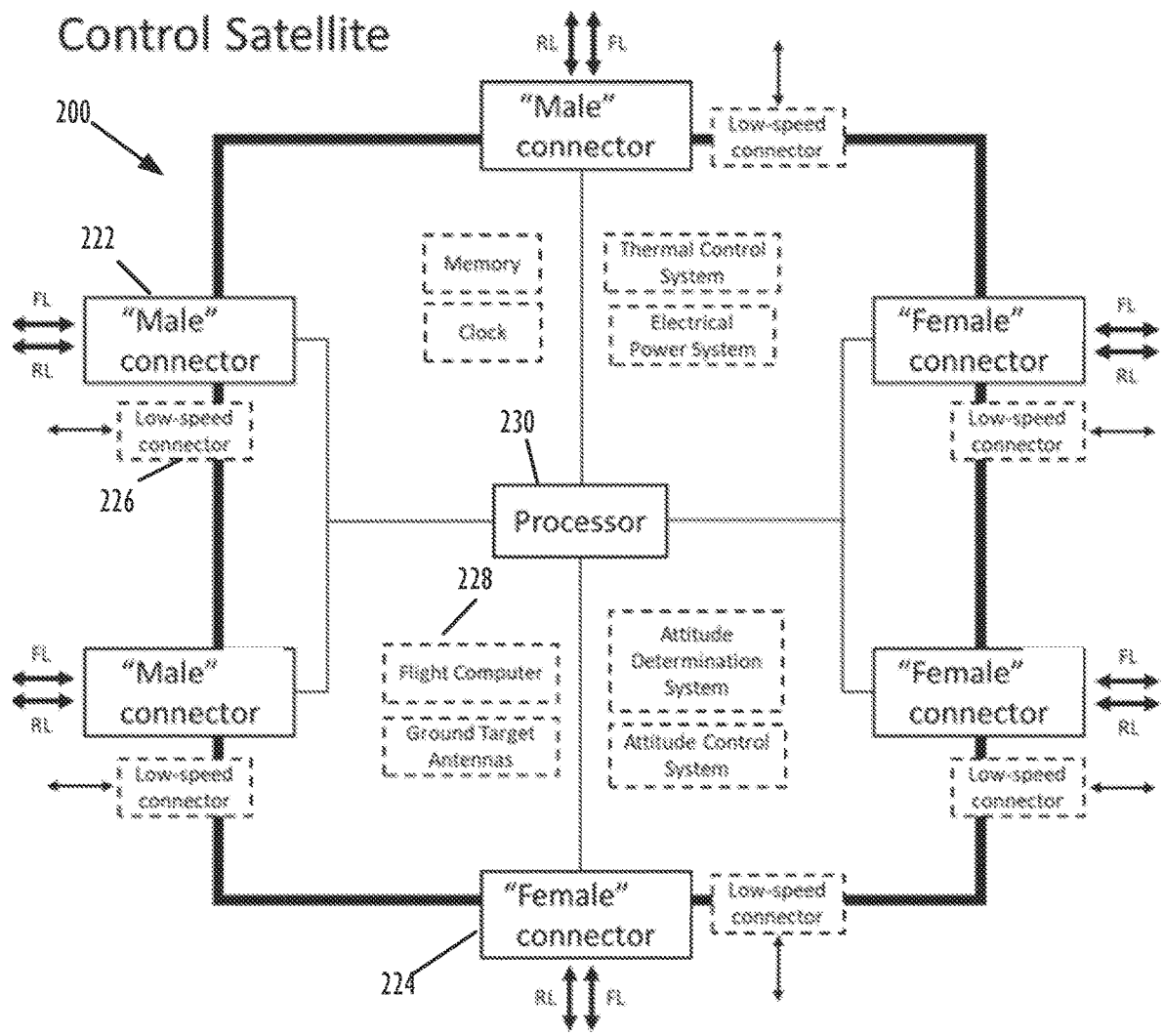
FIG. 2(b) is a block diagram of the control module hardware.

As seen in FIG. 2(b), the control module 200 has a similar arrangement of male and female connectors 222, 224 to the common module, allowing adjacent common modules 20 to be connected male-to-female or female-to-male with wires as seen in FIG. 3(a). The control module 200 is composed of many components, some of which are ground target antennas that communicate with the ground station gateway 600 (FIG. 1(b)). The ground target antennas create the link between the control satellite 200 and ground stations 600. The ground target antennas are steerable to track the ground station due to the relative motion inherent to LEO orbits. At least one ground target antenna is required for operations, one for redundancy, and any additional antennas can be added to permit additional redundancy or for multiple antennas to be used simultaneously. The antennas are deployed on orbit (as steerable antennas generally are in space) and you need one minimum for operations and one for redundancy. Having communications with more than one ground station at once requires additional antennas. The ground target antennas pass return link and forward link data to and from the ground station.

The control module 200 can also include, for example, a flight computer 228, a processor 230, memory core, clock, electrical power system, thermal control system, attitude determination system, attitude control system, low-speed connectors 226, and high-speed connectors 222, 224. The control module 200, depending on its shape and size, may be adjacent to one or more (including more than four) common modules 20. The control module 200 has a number of high-speed connectors 222, 224 and low-speed connectors 226 equivalent to the number of common modules with which it is adjacent.

Communication between modules 20 and the control satellite 200, either directly or indirectly, is essential to the coordinated use of modules to form a large aperture phased array in space. The signal that any one antenna receives from Earth may not by itself be of high enough quality to discern a signal sent from Earth due to external sources of signal noise. However, calculations performed on the sum of the signals received by all or a subset of the antennas in the phase array can be used to discern signals sent from Earth. It is for this reason that the signals received by the modules 20 must be sent to the control satellite 200 for processing. This data originates at each of the modules and is bound for the control satellite and so falls under the category of RL data.

To send a signal using the large aperture phased array in space, it is essential to operate the antennas 28 on all or multiple modules 20 in a coordinated fashion to send a directed signal to the intended target. This requires that the signal information and the list of participating modules originate at the control satellite 200. This information must be distributed to the corresponding modules and falls under the category of FL data.

Figure 3B:
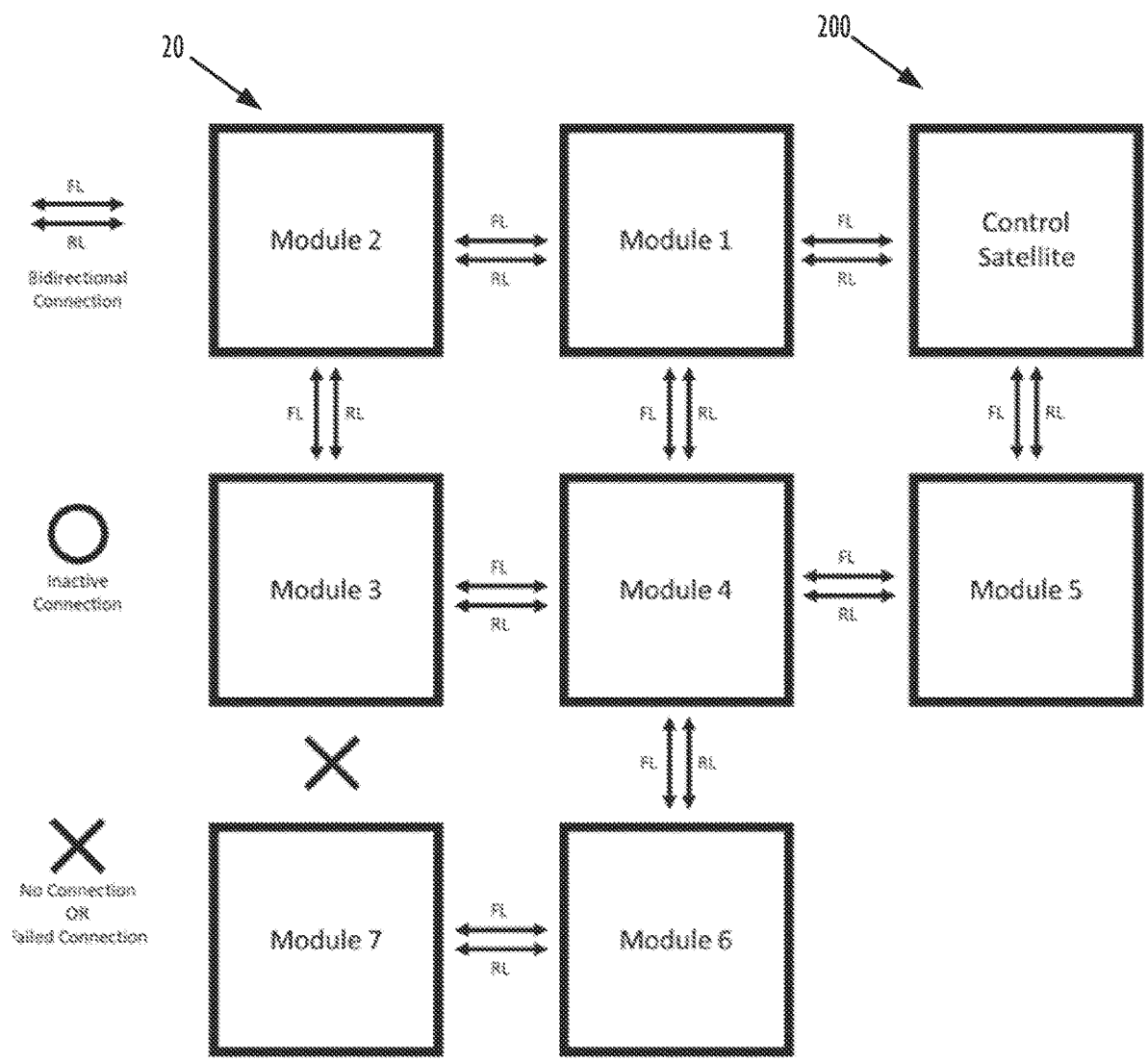
FIG. 3(b) is a block diagram of the web of connections making up the system architecture representing the embodiment of the disclosure shown in FIG. 3(a)

Connections can exist between adjacent modules 20 or between a module 20 and the control satellite 200 when the module is adjacent the control satellite 200. Connections between adjacent modules as seen in FIG. 3(b) are present where wires are used to join to the corresponding connectors of adjacent modules as seen in FIG. 3(a). The connections can either be set to an active state where data is transferred or set to a passive state where no data is transferred. Connections between adjacent modules are always beneficial, but are not always present due to electrical considerations, mechanical considerations, or other factors precluding the use of wires between adjacent modules. Each module 20 must have connection to at least one adjacent module 20 and/or the control satellite 200. The control satellite 200 must have a connection to at least one adjacent module 20, although it is often the case that the control satellite 200 is connected to four or more adjacent modules 20. One connection is shown, for example, in U.S. Patent Pub. Nos. 2020/0361635, 2020/0366237, and 2020/0365966, filed May 15, 2020, the entire content of which is hereby incorporated by reference, though any suitable connections can be utilized.

A connection between module n 20 and an adjacent module n-1 20 or an adjacent control satellite 200 shall have the capability to 1) be inactive, 2) receive FL data (from module n-1) and send RL data (to module n-1), or 3) send FL data module n-1) and receive RL data (from module n-1). In cases where module n is adjacent to module n-1 and a connection exists, a connector of module n is linked with a wire to a connector of module n-1. One of the connectors will be male and the other female and which connector type belongs to module n depends on the relative orientation of the adjacent module n-1, as seen in FIG. 2(a). In some embodiments, the male and female connectors can be integrated in a common housing, and in some embodiments the male and female connectors can be separate components.

Connections, unless specifically referred to as low-speed, are for the transmission of high-speed data, where primarily this is information going to and from the control satellite 200 that contains the signal that is being sent to the UEs or the signal information that is being received from the UEs on the ground. Connections for high-speed data can also be used to transmit or receive commands, telemetry, or other information. In particular, the male and female connections 22, 24, 222, 224 are high-speed, whereas connectors 26 are low-speed.

In one embodiment, every module 20 in the array must have at least one connection with at least one of its adjacent modules 20 or the control satellite 200 that allows it to send RL data directly or indirectly to the control satellite 200 as well as receive FL data directly or indirectly from the control satellite 200. In addition, the control satellite 200 must generate RL routing paths and FL routing paths that allow each module 20 to send RL data directly or indirectly to the control satellite 200 and receive FL data directly or indirectly from the control satellite 200. In one embodiment, a module 20 can be used only for RL data or FL data, and need not communicate both data and need not be in both the FL and RL communication paths.

All modules 20 that are not adjacent to the control satellite 200 must pass data indirectly to and from the control satellite 200 by using other modules 20 as intermediaries. Module n that is not adjacent to the control satellite must pass RL data to an adjacent module n-1 and also receive FL data from module n-1. In this manner, module n-1 becomes an intermediary between module n and the control satellite. Any data from module n 20 and bound for the control satellite 200 will pass through module n-1 20 and any data from the control satellite 200 and bound for module n will pass through module n-1.

To minimize the amount of RL data that module n-1 must pass on to module n-2, it aggregates the RL data received by module n with its own RL data from its own processor and any RL data received by other adjacent module(s). This aggregated RL data is then passed on to module n-2 and any intermediate modules thereafter, each of which in turn performs an equivalent aggregation process of all sources of RL data. Modules that have only one source of RL data will not undergo aggregation process but instead pass on RL data directly to the next module.

In the manner described above, module n can receive RL data from up to two adjacent modules n+1 and n+2. If a module n receives RL data from an adjacent module or multiple modules, then it aggregates that data with the RL data produced by its own antennas. This aggregation occurs at each module in a series chain until the data reaches control satellite at which point the RL data flow terminates. The control satellite aggregates the RL data from each of the adjacent modules with which it is communicating. The inverse process occurs for FL data. Any time RL data flows to an adjacent module, FL data is passed in the opposite direction. This means that FL data may be required to be split at module n and pass to modules n+1 and n+2. This splitting of the FL data occurs wherever there are multiple sources of RL data are received by a module. When split, the FL data is copied on module n and so that modules n+1 and n+2 and its own antennas each receive an equivalent full FL data signal.

The sum of the connections between modules that are actively used for the flow of RL data, as it aggregates on its path towards the control satellite, is referred to as the routing path of RL data, or RL routing path, or RL communication routing path. The sum of the connections between modules that are actively used for the flow of FL data as it is passed between modules and/or split on the inverse path from the control satellite to each module is referred to as the routing path of FL data, or FL routing path, or FL communication routing path. In one embodiment, the FL and RL routing paths each must include every common module 20, unless a module 20 is not designated for that communication or there is a failure precluding its use as such.

The control satellite 200 is always the terminal point for RL data and the originating point for FL data. This means that RL data is never sent to common modules from the control satellite and FL data is never sent from common modules to the control satellite.

Since RL data can aggregate at intermediate modules on its path to the control satellite, all RL data must be accompanied by an indicator of which modules have sent the information. This can be accomplished, for example, through the use of a module identification (ID) tag, which is encoded and attached to each RL data packet that is sent. Similarly, FL data that is sent through intermediate modules is accompanied by an indicator of which module the information is intended for. This can be accomplished, for example, by encoding and attaching a similar module ID tag to any FL data packet that is sent.

A routing path is, in practice, a data set made up of a number of data packets equivalent to the number of modules. Each module has four connectors and each of these connectors may or may not have wires allowing them to communicate with adjacent modules (thus creating "connections" with said adjacent modules). Each connector can either be 1) inactive, 2) be used for RL output and FL input, or 3) be used for RL input and FL output. To convey how each connector on each module should be used, each data packet contains a module ID tag and four values between 1-3 (1 for inactive; 2 for RL out and FL in; and 3 for FL out and RL in), each value indicating how its four connectors shall be used. In enacting a specific routing path as sent by the control satellite 200, any given module must only identify the data packet associated to it by its module ID tag, and then configure its four connectors according to the four values therein. It is the task of the control satellite 200 to ensure that commanded routing paths permit all modules to communicate directly or indirectly with the control satellite 200.

The following Table 1 demonstrates the form of the routing path for the arrangement of modules and operation shown in FIG. 4(a). The terms top, right, bottom, and left are used to reference the relative orientation of modules and connectors in FIG. 4(a), with each connector referring to one of the four connectors 22, 24 as shown in FIG. 2(a).

TABLE 1

| Module ID tag | Top Connector | Right Connector | Bottom Connector | Left Connector |
|---|---|---|---|---|
| 1 | 1 (inactive) | 2 (RL out & FL in) | 3 (FL out & RL in) | 3 (FL out & RL in) |
| 2 | 1 (inactive) | 2 (RL out & FL in) | 3 (FL out & RL in) | 1 (inactive) |
| 3 | 2 (RL out & FL in) | 1 (inactive) | 1 (inactive) | 1 (inactive) |
| 4 | 2 (RL out & FL in) | 3 (FL out & RL in) | 3 (FL out & RL in) | 1 (inactive) |
| 5 | 1 (inactive) | 1 (inactive) | 1 (inactive) | 2 (RL out & FL in) |
| 6 | 2 (RL out & FL in) | 1 (inactive) | 1 (inactive) | 3 (FL out & RL in) |
| 7 | 1 (inactive) | 2 (RL out & FL in) | 1 (inactive) | 1 (inactive) |

The sum of the connections across the various sides of module n to adjacent modules makes up the available connections that can be used for communication on that module. The sum of all connections across all modules and the control satellite is referred to as web of connections or the system architecture. The system architecture is a description of all the possible ways in which RL/FL data can flow across connections in the system as a whole.

A module n with connections to multiple adjacent modules (e.g. n-1, n-2, or n-3) can provide redundancy. This degree of redundancy is dependent upon the arrangement of connections when considering the overall arrangement of the system architecture. It should be noted that connections between adjacent modules are often left in a passive state but can be activated in to bypass failures elsewhere in the system, thus providing redundancy. In one embodiment, module n can only use up to three of its possible four connections, meaning that many connections between adjacent modules will go unused at any one point in time.

As shown in FIGS. 3(a)-3(b) and FIGS. 4(a)-4(d), each module 20 may be directly adjacent to up to four modules 20 or the control satellite 200 and up to three modules 20, The control satellite 200 may be directly adjacent to four or more modules, depending on its size. Each module 20 may have a connection to all or a subset of its adjacent modules 20 and or the control satellite 200. This connection architecture must create at least one path by which module n can receive FL data from and send RL data to the control satellite through a series chain of adjacent modules that serve as intermediaries. Having more than one path provides redundancy in case of failures of any sort. This is especially important when the modules 200, 20 are used in space and are extremely difficult and expensive to repair or replace and may be subject to failure due to extreme environmental conditions.

FIG. 4(a) shows an example system architecture. A robust system architecture ensures that the arrangement of available connections allows for multiple paths for each module to communicate directly or indirectly with the control satellite so that component failure(s) can be accommodated. In this example system architecture, module 7 must communicate RL data to module 6 and receive FL data from module 6 only. This demonstrates a portion of the architecture that lacks redundancy. A connection between module 7 and module 3 would be preferable, but connections between adjacent modules may not always be possible due to mechanical constraints, failed components, or other reasons. Module 2 provides an example of redundant system architecture, as it has three data paths to the control satellite. The first data path is through Module 1 as the only intermediary, a second data path is through Modules 3, 4, and 1 as intermediaries, and a third data path is through Modules 3, 4, and 5 as intermediaries.

A combination of active connections that permits RL data and FL data to flow directly or indirectly between each module and control satellite is referred to here as a routing path. A routing path is maintained until a failure or other occurrence necessitates the altering of the routing path. A routing path that successfully allows all modules to communicate with the control satellite in the required manner must have a number of active connections equivalent to but not exceeding the number of modules.

FIG. 4(a) shows a routing path (for both FL and RL communications) of the system architecture shown in FIG. 3(a)-(b). This routing path can be one mode of operating the set of modules described by the example architecture shown in FIG. 4(a). Only two of the available connections between adjacent modules that exist in the system architecture are unused by this routing path. The unused connection can be used should a new routing path require it. The used connections, except for the connection between the control satellite and its adjacent modules, can he reversed in direction should a new routing path require it.

Figure 4B:
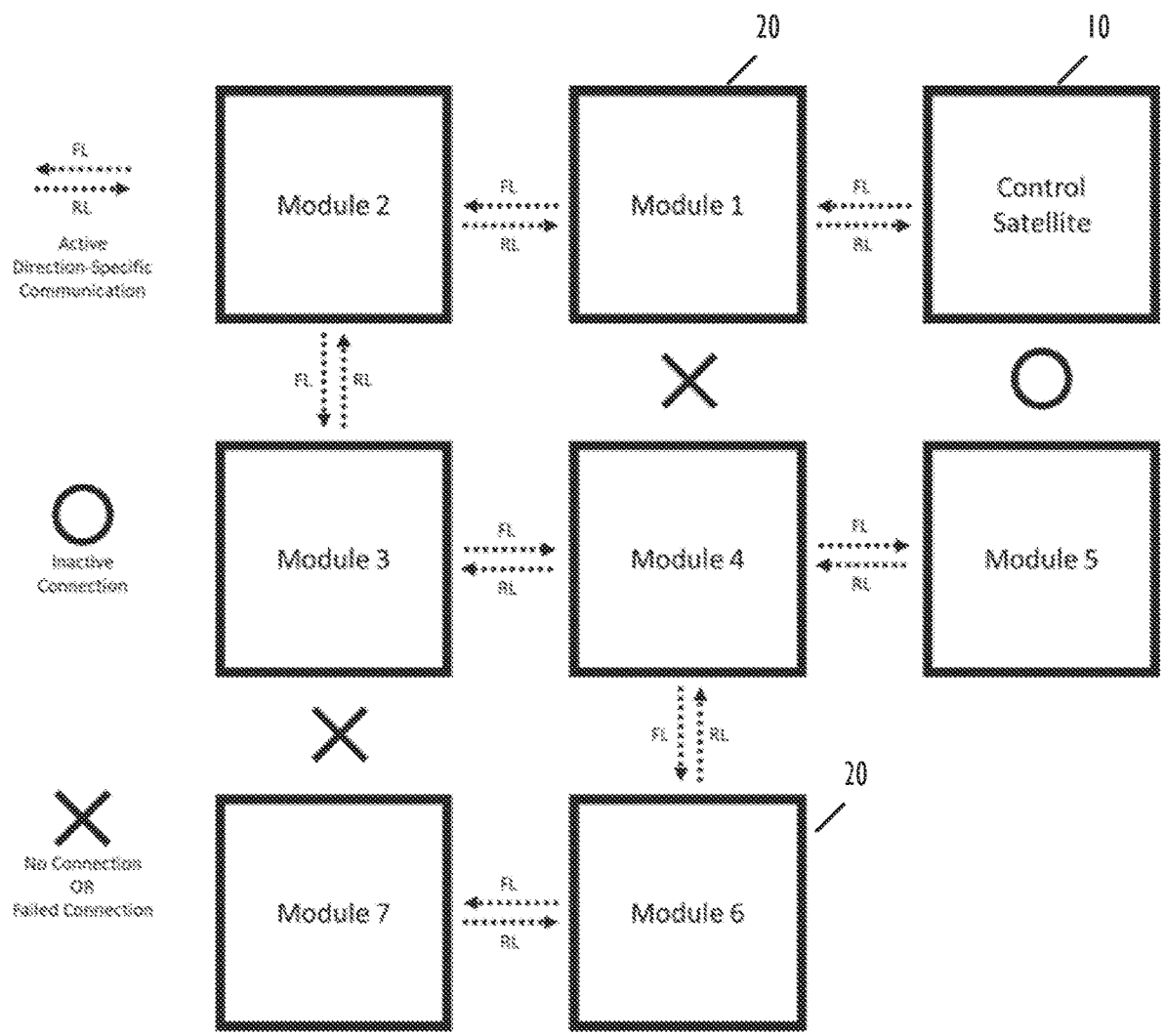
FIGS. 4(b)-(d) are block diagrams of example routing paths within the web of connections of FIG. 3(a) after observed failure(s)

Referring to FIG. 4(b), a second (or alternate) routing path of the system architecture can be created through a different subset of the available connections in the system architecture. This second routing path demonstrates the capability to accommodate a failure in the connection between module 1 and module 4.

If at one point in time, the modules 20 are utilizing the routing path shown in FIG. 4(a) and then a failure is detected in the connection between modules 1 and 4; a command can then be sent along the low-speed line 26 to each module 20 indicating that the routing path described in FIG. 4(b) is to be adopted. Module 4 would then stop communicating with module 1 and would communicate with module 3 instead. In this manner, the failure could be accommodated, and each module could continue to communicate the necessary information to and from the control satellite.

Figure 4C:
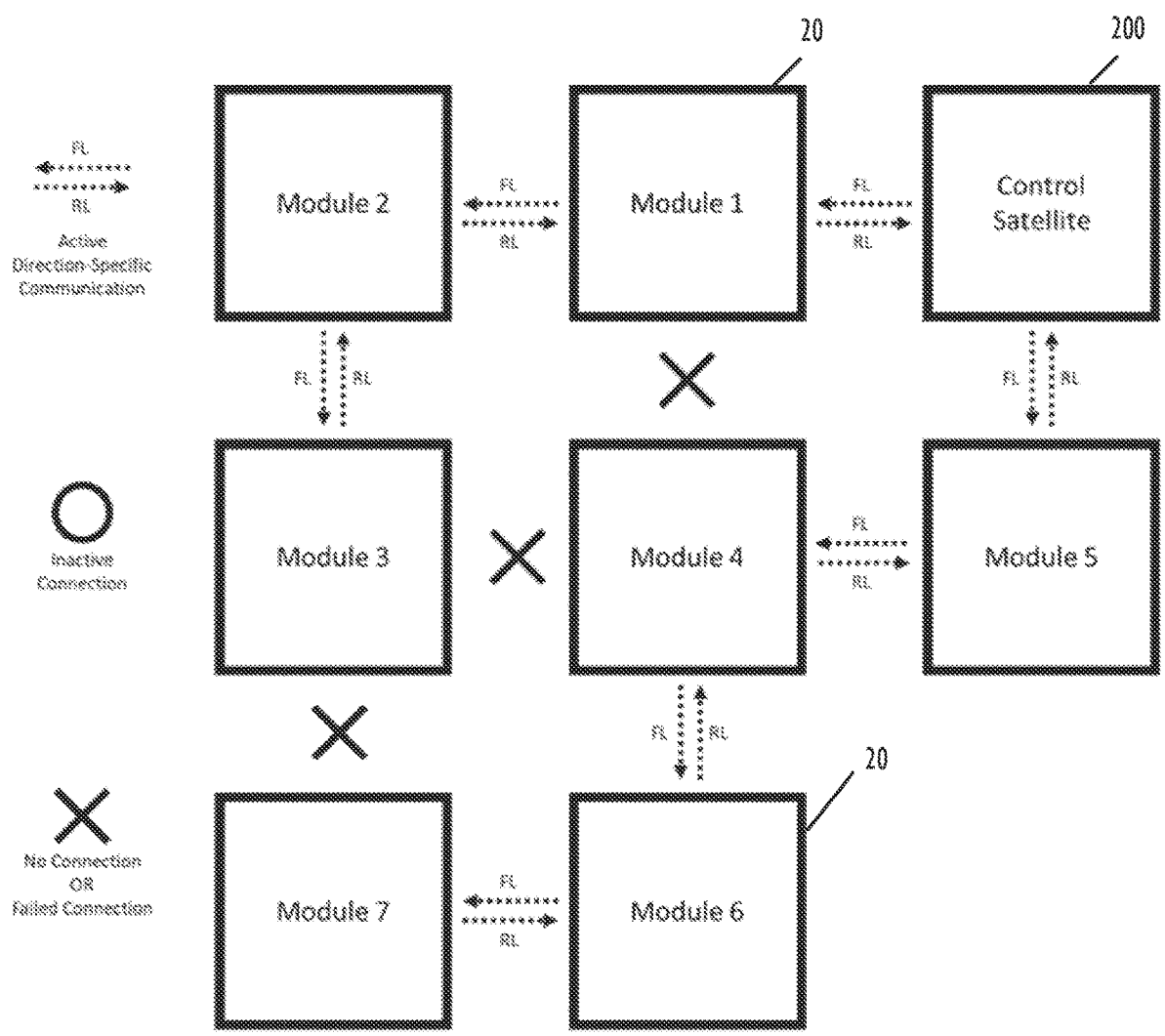

Referring to FIG. 4(c), a third routing path of the system architecture can be created through a different subset of the available connections in the system architecture. This third routing path demonstrates the capability to accommodate a failure in the connection between module 1 and module 4 as well as a failure in the connection between module 3 and module 4.

If at one point in time, the modules 20 are utilizing the routing path shown in FIG. 4(b) due to a failure in the connection between modules 1 and 4 and then a failure is detected in the connection between modules 3 and 4; a command can then be sent along the low-speed line 26 to each module 20 indicating that the routing path described in FIG. 4(c) is to be adopted. Module 4 would then stop communicating with module 1 and would communicate with module 5 instead. Module 5 would then begin communicating with both module 4 and the control satellite. In this manner, the failure could be accommodated, and each module could continue to communicate the necessary information to and from the control satellite.

The high-speed connectors 22, 24 provide the main communication link between modules that is used to transmit the RL and FL data necessary for phase array communications. Alternatively, a low-speed line 26 provides a backup communication link to send limited data, such as routing path commands, from the control satellite 200 to a module 20, from one module 20 to another, or from a module 20 to the control satellite 200. A low-speed connection between adjacent modules exists wherever a high-speed connection exists. The low-speed line is not capable (i.e., not designed to be capable) of transmitting the RL and FL data flow but must be capable of receiving and sending commands. In one embodiment, a separate low-speed line is not utilized, but instead routing path change commands are sent over high-speed lines that have not failed. In yet another embodiment, the low-speed line can be capable of communicating the high-speed data.

In the event of a failure, the low-speed line must be able to receive commands that can initiate the use of redundant high-speed connections which resume RL and FL data flow across the high-speed lines. This includes, but is not limited to, the reporting of component failures, reporting module failures, transmitting new routing path solutions, and transmitting new back-up routing path solutions that are to be held in memory in anticipation of possible future failures.

The low-speed lines are the default means of transmitting any data that is not RL or FL data. In one embodiment, high-speed is 1 GBps or higher and low-speed is less than 1 GBps. However, the data rates each can handle are dependent upon design-specific features (cable length, signal gain, etc.).

If the system architecture described in FIG. 3(a) were less robust (e.g. not including a connection between modules 1 and 4), then fewer types of failure could be accommodated. It is for this reason that increasing the number of connections between modules is beneficial, despite the corresponding increase in inactive connections prior to failures.

Each module 20 has a unique module ID and information originating from that module is tagged with its module ID and sent to the control satellite 200. Information from the control satellite 200 and bound for that module 20 will be tagged with the same module ID. When modules 20 receive information, they only act on information that is tagged for that specific module but will pass on any additional information received. Modules 20 are not always able to be connected to an adjacent module 20. In one embodiment, the control satellite 200 is bounded by 8 modules 20, but there could be 12 or potentially more modules 20 bounding the control satellite 200.

Figure 4D:
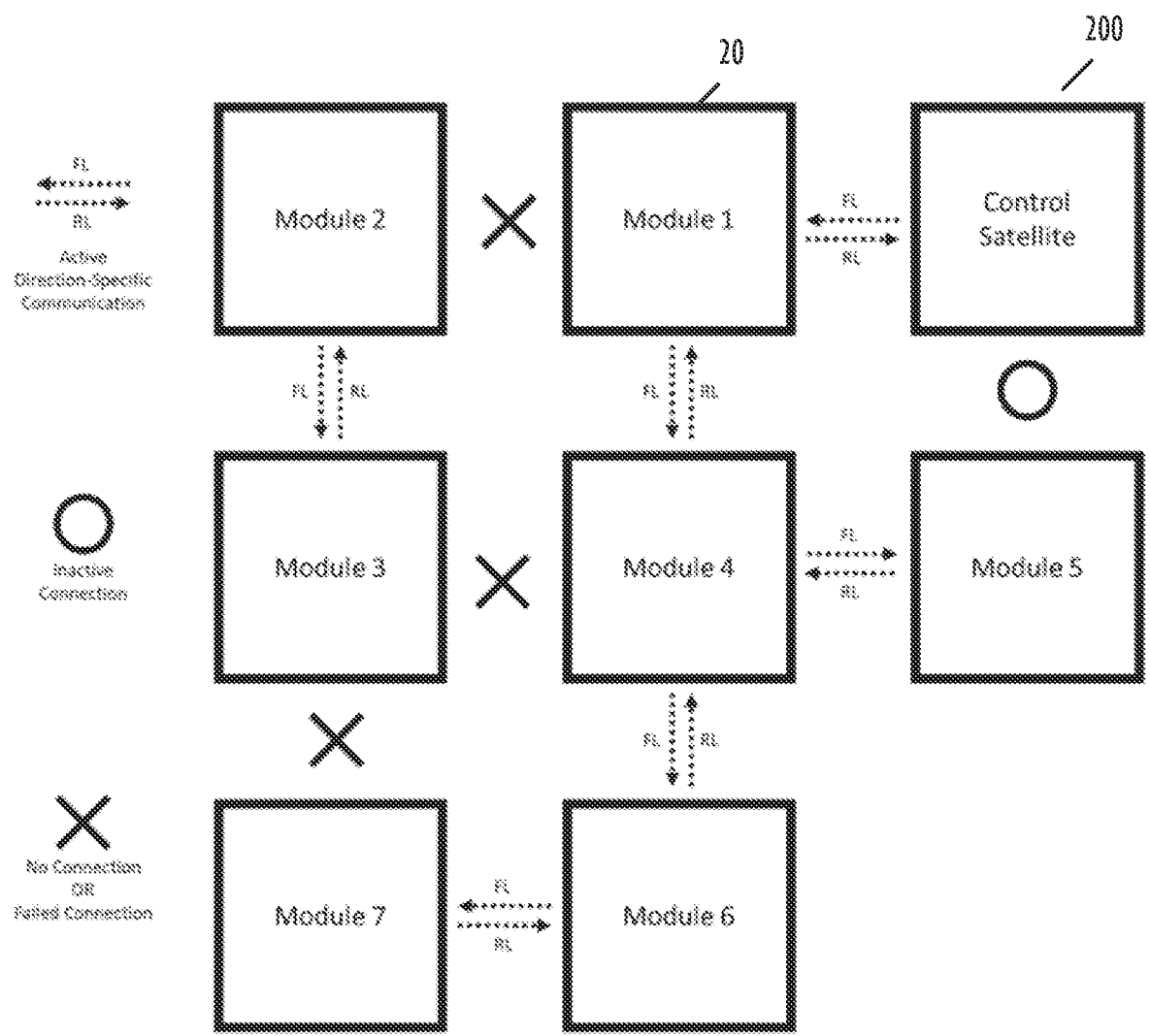

Given that RL and FL data must flow through intermediate modules in a specific manner, each module 20 in the set m must be coordinated such that communication can pass between all modules 20 and the control satellite 200 in the required manner. If the connections used by each module were haphazardly selected, then it is entirely feasible that some modules would be incapable of communication with the control satellite. FIG. 4(d) is an example of an invalid routing path. In this case, modules 2 and 3 are only communicating amongst themselves and have no means of communicating with the control satellite in the required manner.

It can be discerned from FIGS. 4(a)-4(d) that for each connection between adjacent modules that passes FL data, RL data will pass in the opposite direction. For this reason, the FL routing path and the RL routing path are the inverse of the other. Using this characteristic, a routing path can be solved for either the FL or RL and then extended to the complementary portion through inversion. However, in one embodiment, a single connection can be provided, but not both (e.g., either FL or RL, but not both FL and RL).

A directed graph can be created as an abstract mathematical representation of web of connections between modules. Each module is represented as a "node" in the graph and the connections between the modules are represented as the "edges" in the graph. Nodes and edges are terms used in graph theory and so they are used here only to conform with norms in this field of mathematics.

Figure 5A:
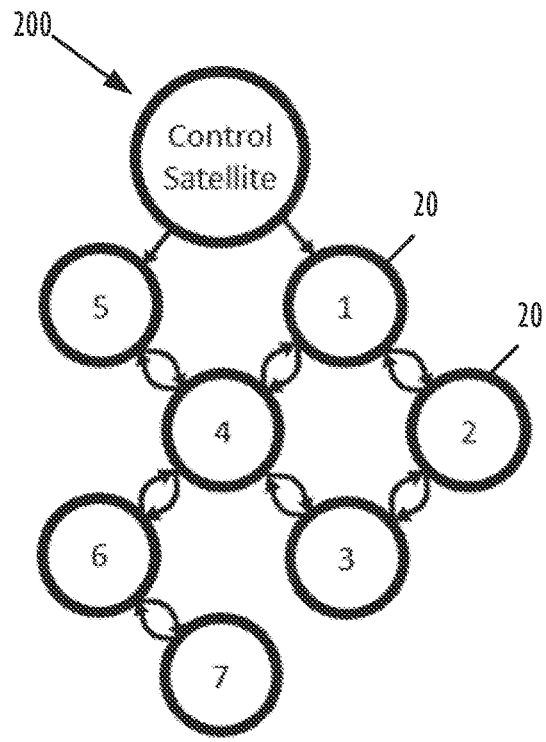
FIG. 5(a) shows the web of FL connections of FIG. 3(a) in the form of a directed graph.
Figure 5B:
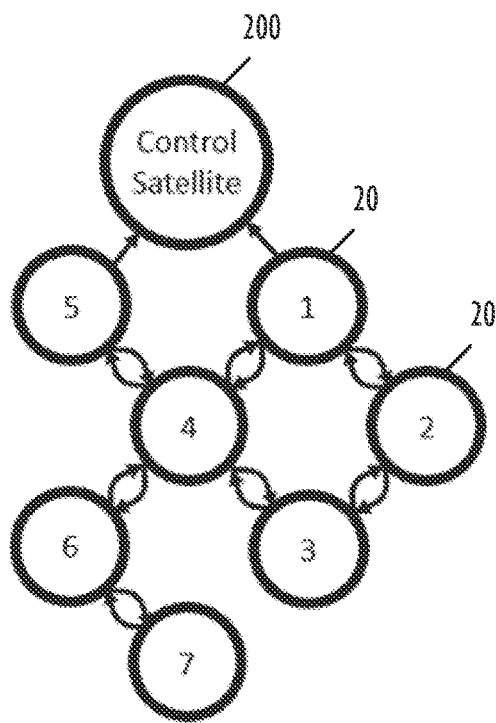
FIG. 5(b) shows the web of RL connections of FIG. 3(a) in the form of a directed graph.

FIG. 5(a) shows a directed graph that is an abstract representation of the modules, control satellite, and available FL data connections in the example system architecture shown in FIG. 3(b). The connection between the control satellite and adjacent modules is unidirectional, since FL data is never received by the control satellite. FIG. 5(b) is a directed graph that is an abstract representation of the available RL connections in the same example system architecture of FIG. 3(b). The connection between the control satellite and adjacent modules is similarly unidirectional, since RL data is never received by the control satellite. When combining the information contained in FIGS. 5(a)-5(b), it is possible to reconstruct all the connections of the example system architecture shown in FIG. 3(b), but not the relative positions. FIGS. 5(a)-5(b) are directed graphs that are used to describe the system architecture. Only the connections are relevant when determining routing paths and so this abstract representation contains only what is necessary to determine routing paths.

Figure 5C:
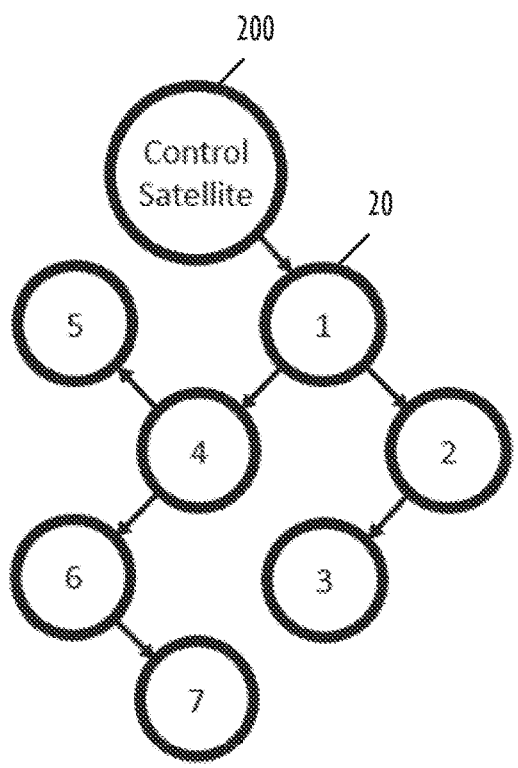
FIGS. 5(c)-(e) show example routing paths for RL data within the web of RL connections of FIG. 3(a) in the form of a directed acyclic graph.

FIG. 5(c) is a directed acyclic graph that is an abstract representation of the FL routing path that has been solved for using graph theory. FIG. 5(c) contains all of the information necessary to reconstruct FIG. 4(a), except for the relative position of the modules. This means that FIG. 5(c) is a description of a FL routing path.

Figure 5D:
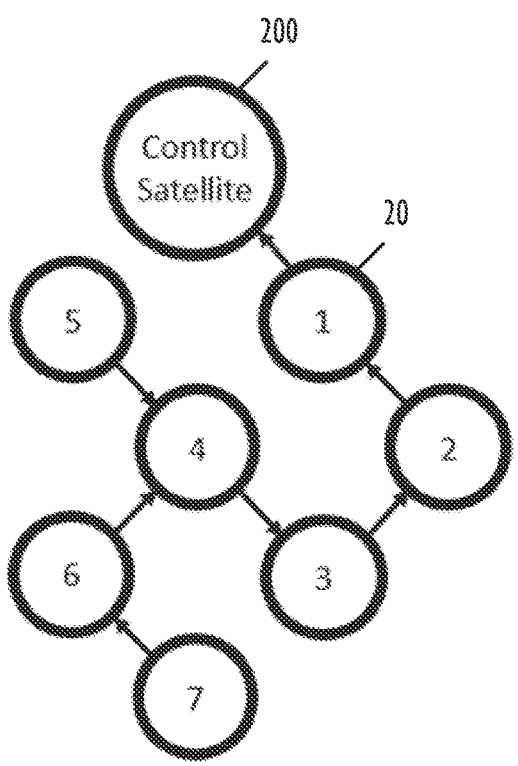

FIG. 5(d) is the RL portion of the routing path that is solved as the inverse of the FL routing path. Just as is the case with FIG. 5(e), FIG. 5(d) contains all of the information necessary to reconstruct FIG. 4(a), except for the relative position of the modules. This means that FIG. 5(d) is also a description of a RL routing path. FIG. 5(c) and FIG. 5(d) are the inverse of one another and so are redundant in that the information required to reconstruct FIG. 5(d) is included within FIG. 5(c), and vice versa. This characteristic also holds true for the system architectures described by FIG. 5(a) and FIG. 5(b).

Once a system architecture representing a real collection of a control satellite and plurality of common modules has been developed, a routing path must be resolved that permits each module to communicate with the control satellite in the desired manner. The system architecture is described by means of a directed graph and routing paths are solved for using that directed graph. The routing path that permits all modules to communicate with the control satellite in the required manner is an acyclic directed graph.

FIGS. 3(a)-(b) and FIGS. 5(a)-(b) are all different ways of describing the same example system architecture. FIG. 4(a) and FIGS. 5(c)-(d) are all different ways of describing the same routing path within said system architecture. FIGS. 4(b)-(c) are alternate routing paths within said system architecture. Prior to a failure within said system architecture, any of the routing paths of FIGS. 4(a)-(c) are functional equivalents. Any other routing path generated within said system architecture that permits RL and FL data to flow as necessary are also functional equivalents.

While the example system architecture involves a relatively small number of modules for the purposes of simplicity, system architectures with a large number of modules are often far more complex. Increasing the complexity of the system architecture makes finding routing paths more computationally challenging. It is for this reason that graph theory techniques are adopted when solving for routing paths based on complex system architectures.

Routing paths can be solved for large numbers of modules using graph theory techniques. An algorithm using techniques developed in the field of graph theory can take a directed graph (system architecture) and create acyclic directed graphs (routing paths). These acyclic directed graphs contain all the information necessary to describe a routing path of the system architecture and are therefore functional equivalents of a routing path.

Figure 6:
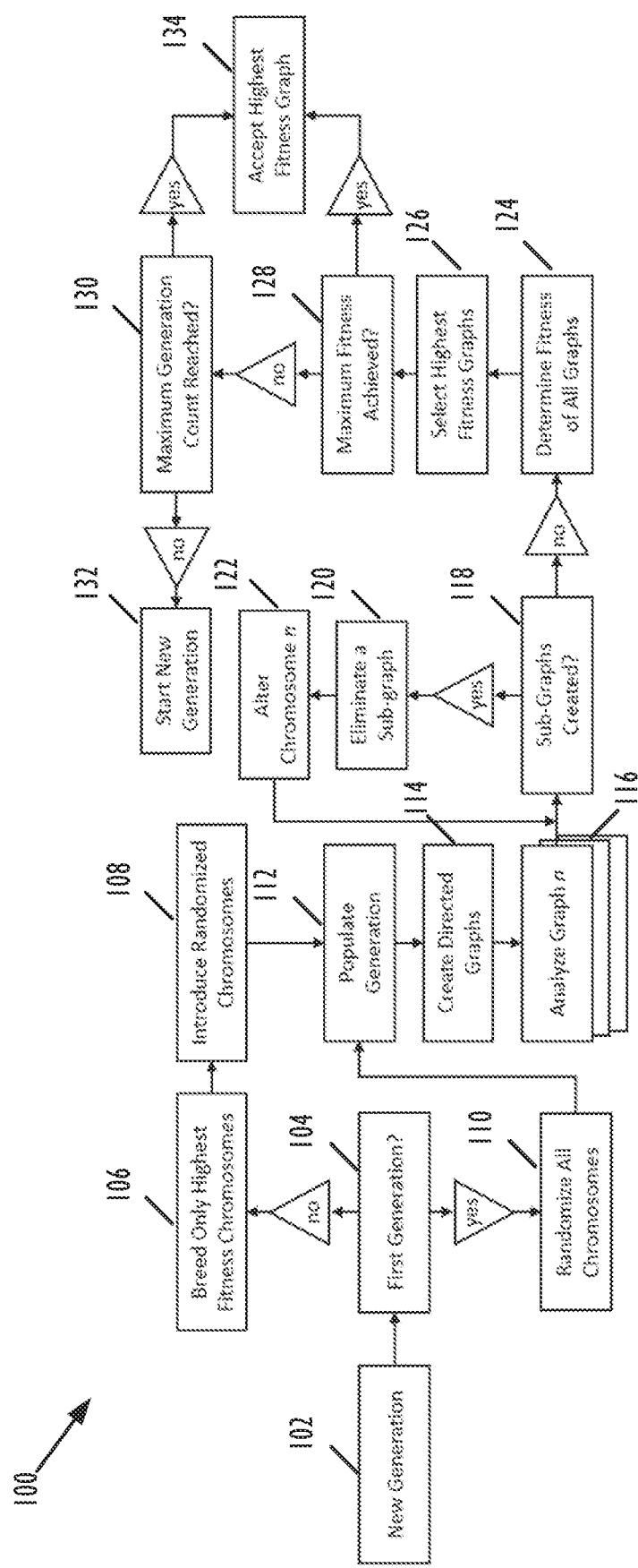
FIG. 6 is a flow diagram illustrating the operation of the genetic algorithm.

FIG. 6 is a flowchart of a genetic algorithm used to solve routing paths using the input of a directed graph that is a representation of the FL or RL module connectivity. Given that describing both the FL and RL portion of a routing path or system architecture is redundant, only the RL portion of a solution is discussed moving forward and it is assumed that the FL portion of the solution shall be reconstructed through inversion. That is, RL communication in one direction is always paired with FL communication in the other direction, and vice versa. To switch between FIGS. 5(c) and 5(d) (or vice versa), for example, you need only invert the directions of each edge in the graph. This means that describing both the RL routing path and FL routing path is apparent (i.e., redundant) from a single directed graph.

Genetic algorithms are used to solve problems in which the solutions can be described by a set of variables and where solutions can be evaluated by predetermined metrics. There are functional equivalents to genetic algorithms, such as simulated annealing, which are categorized as heuristic approaches. Heuristic approaches use information gathered from attempted solutions to guide a future solution attempts towards optimality. This differs from a brute force approach that tries all possible permutations of a problem's solution space to determine the optimal solution. Given that system architectures are often highly complex, brute force approaches to finding routing paths are computationally infeasible. However, for problems with more than one acceptable solution such as this, heuristics can be used to find an acceptable routing path with less computation time than a brute force approach.

A solution in this case is a set of connections within the system architecture that are used for communication by each module. If the solution permits all modules to communicate with the control satellite as required, then the solution is referred to as a valid routing path. If the solution permits only k modules out of a total of m modules to communicate with the control satellite as required, then the fitness of that solution is said to be equivalent to k. A solution that permits each module to communicate with the control satellite as required has a fitness k equivalent to the total number of modules m. It is in this manner that solutions are evaluated for their ability to permit the desired communication between modules and the control satellite.

Each solution can be referred to as a chromosome. Each chromosome is of size m, where m is the number of modules in the graph. A chromosome is used here to describe the full set of variables that form a solution. Each component part of a chromosome is referred to as a gene. Gene n is a variable that refers to module n and it describes to which adjacent module RL data should be passed, so that the chromosome is the entire set of all connections that should be used by all modules to send RL data across. The possible options of gene n are limited to the connections that exist between module n and adjacent modules within the system architecture.

Using the system architecture described by FIG. 5(b) as an example, gene 3 (referring to module 3), is a variable with options 2 and 4, which indicates that module 3 can send RL data to either module 2 or module 4, respectively. The number of modules that are able to communicate RL data either directly or indirectly (through other intermediate modules) to the control satellite as a result of simulating the adoption of the connections prescribed by a chromosome determines the fitness of the chromosome. If the simulation shows that all of the modules are able to communicate RL data to the control satellite as a result of the adoption of the electrical connections prescribed by a chromosome, then the chromosome is said to describe a routing path that is a maximally fit solution to the problem at hand. Once all genes of a chromosome have been set, then a directed graph can be formed using that information. An example of this is seen in the following Table 2. The chromosome and genes will be as follows.

TABLE 2

| Gene: | 1 | 2 | 3 | 4 | 5 | 6 | 7 |
|---|---|---|---|---|---|---|---|
| Value: | 4 | 1 | 2 | 3 | 4 | 4 | 6 |

Figure 5E:
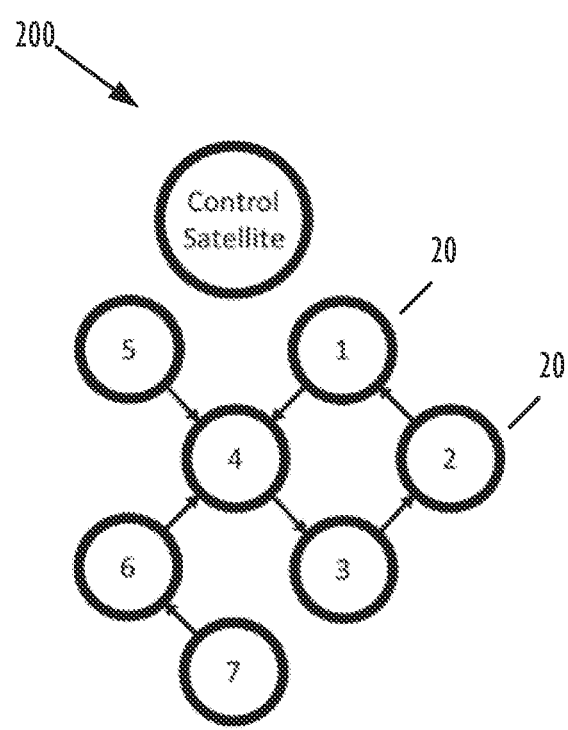

In the example of FIG. 5(e) that is the directed graph representation of the chromosome of Table 1, although each module 20 is passing RL data, no modules are able to communicate RL data with the control satellite 200 and so its fitness k would be described as zero. This solution includes "data flow loop" or "sub-graph" as it is referred to in the field of graph theory. The sub-graph can be eliminated through an adjustment of the chromosome. A sub-graph exists where modules and/or the control satellite are separated into two groups between which no communication can occur. Since the control satellite cannot be part of two sub-graphs at once, it will inherently be part of one of the groups and not the other. This prevents data from flowing between some modules and the control satellite. The elimination of sub-graphs is an alteration of specific genes in response to the formation of a data flow loop. Data flow loops are defined as where a routing path has not been formed between all modules and the control satellite. Gene 1 can be flipped so that RL data is sent to the control satellite (C/S) rather than module 4, as shown in Table 3 below. It is in this manner that chromosomes can be "stitched" to improve their fitness, which permanently alters that chromosome. In this case, with one "stitching" operation, the fitness of the chromosome is increased from 0 to 7, since the number of properly communicating common modules has increased from 0 to 7.

TABLE 3

| Gene: | 1 | 2 | 3 | 4 | 5 | 6 | 7 |
|---|---|---|---|---|---|---|---|
| Value: | C/S | 1 | 2 | 3 | 4 | 4 | 6 |

For any system architecture, a routing path must be solved. FIG. 6 is a flowchart depicting a genetic algorithm or operation 100 that can be used to solve for a routing path given the input of a system architecture. In one embodiment of the disclosure, the genetic algorithm is solved for using computers on the ground and routing paths are sent to the control satellite so they can be adopted. The operation 100 can be implemented at a processing device such as located at the control satellite 200 and/or one or more of the modules 20.

Starting at step 102, the start of a generation marks a new set of attempts the genetic algorithm shall use to create a routing path with fitness k equal to common modules m. This involves the creation of a set of chromosomes, which are the informational equivalent of a routing paths within the system architecture. The number of chromosomes created in a generation is referred to as the population size. At step 104, a logical test determines whether or not this is the first generation that has been created. If this is the first generation that has been created, step 104, then all genes in all chromosomes are randomly selected, step 110. This creates a population that has been entirely randomized.

If this is not the first generation to be created, step 104, then breeding of the previous generation will begin, step 106. Some or all of the chromosomes of the previous generation (usually the highest fitness chromosomes) are selected as "parents" of the future generation. There are many ways in which the "parents" can be used to create the "children". Children are the chromosomes that are to be used in the current generation and are constructed partly or entirely as the product of the genes of the parent chromosomes. There are a vast number of common and uncommon approaches to breeding the chromosomes of parents into children that can be used. The simplest of these approaches is to generate each child as an exact copy a single parent, but the full range of applicable breeding techniques are too expansive to list here. At step 108, if the number of children chromosomes is less than the population size used, then the difference is made up by the creation of new entirely randomized chromosomes.

At step 112, a single population group is formed which is the sum of the children and/or new randomized chromosomes. At step 114, the creation of directed graphs (e.g., as shown in FIGS. 5(*c*)-(*e*)) using chromosomes is what permits graph theory to be used to evaluate the chromosomes. In this step, each gene of each chromosome is used to create one edge (an abstract representation of an active connection used for passing RL data) of the directed graph for that chromosome. Each directed graph that was created in 114 is evaluated, step 116, for the creation of sub-graphs (data flow loops).

At step 118, a logical test occurs based on whether or not any sub-graphs have been created within the generation. If the directed graph was determined to have a subgraph by step 118, then the "stitching" approach of removing sub-graphs, step 120, that has previously been described is used. A targeted gene in the chromosome is altered so that it breaks a data flow loop and reduces the number of sub-graphs. At step 122, this is the permanent alteration of the chromosome that saves any changes to genes that that were made in step 120, At step 124, this is the evaluation of each of the graphs described by the chromosomes in the generation to determine their individual fitness. The fitness is nominally a description of the number of modules in the graph that can communicate with the control satellite in the required manner.

It is possible to apply additional constraints at this point and use those constraints to change the calculated fitness of the chromosome. For example, the number of modules in a series chain can be used to impact fitness. If too many modules are connected in a single series chain, then the time required to aggregate RL data signals may grow too large. In that case, a penalty to the calculated fitness of the chromosome could be based on the number of modules formed into a series chain. Doing so will disincentivize the algorithm from selecting chromosomes with long series chains.

Once the fitness of all chromosomes has been determined, step 124, they can be sorted according to their fitness, step 126. This allows the highest fitness chromosomes to be selected for the purposes of breeding into the next generation. If there is a chromosome in the generation which satisfies the condition of a valid routing path (that all modules are connected to the control satellite in the required manner) and has not violated additional constraints that would incur fitness penalties, then the fitness k of said chromosome will be equal to the number of modules m, then the logical test in step 128 will be satisfied and the algorithm will have reached its goal, step 134. Otherwise, the algorithm may continue, step 130. Step 130 is a logical test as to whether or not the number of generations that have been reached exceeds the maximum allowed. The maximum number of allowed generations is a constraint that is determined by the user and can bypass the creation of a new generation of chromosomes.

Finally, at step 134, the highest fitness chromosome is the final solution that is adopted as the mode of operation for the communication between modules and the control satellite. If this point is reached because the highest theoretical fitness was achieved by a chromosome (a routing path was found), then all modules will be able to communicate with the control satellite as required upon the adoption of the routing path, which is considered optimal. If this point was reached because the maximum number of generations was reached, then the solution that was adopted will not allow all modules to communicate with the control satellite.

Not every system architecture has the potential to form a routing path that achieves maximum fitness. This can be the result of failures, insufficient connections in the designed system architecture, or both. Also, the complexity of a system architecture may make finding a routing path that achieves maximum fitness computationally cumbersome. The maximum number of generations is used to limit the number of computations performed on a system architecture to a reasonable level, even if this means that a suboptimal solution is adopted.

If, at step 128, the maximum number of generations has not been reached and the maximum fitness has yet to be achieved, step 130, then the algorithm at step 132 returns to the beginning and creates a new generation, step 102, making use of some or all the current population of chromosomes as parents, which represent lessons learned by the current generation.

Prior to the first operational use of the system, the algorithm is used to solve for a routing path that assumes no system failures and allows FL and RL communication between each module 20 and the control satellite 200 in the required manner. In the absence of system failures that prevent the use of this routing path, each module will communicate using only the connections prescribed by the routing path. Additionally, a set of routing paths are calculated for each possible single point failure that may occur in the entire system. This involves solving for and saving a number of routing paths equivalent to the number of single point failures in the system.

If the system architecture is as described in FIG. 3(*a*)-(*b*), then the primary routing path saved can be the routing path described in FIG. 4(*a*). For the single failure point of the connection between module 1 and module 4, the back-up routing path for this specific failure can be the routing path described in FIG. 4(*b*). However, this just describes one back-up routing path, and a set must be created for each potential single failure point.

The back-up routing paths can be saved either in the memory of the control satellite 200 or on the ground and relayed up to the control satellite 200 in the event of a failure, or at the memory of one or more of the modules 20. In one embodiment, upon failure, the control satellite relays the routing path to each common module. The common modules then adopt the routing path. The number of routing paths saved is equal to the number of unique failure points in the system architecture. Failures can be detected by the control satellite 200 as a lack of responsiveness or otherwise improper communication from a single module or multiple modules. Failures may also be detected by a common module 20 as a lack of responsiveness or otherwise improper communication from a single module or multiple modules. It is likely that there will be ambiguity as to the particular point of failure and whether the failure is temporary or can be resolved. A back-up solution can be adopted immediately, or the current solution can be maintained until more information as to the nature of the failure has been acquired. Troubleshooting is to begin immediately upon detecting a failure in the attempt to establish details on the specific failure point and whether it can be resolved.

Figure 7A:
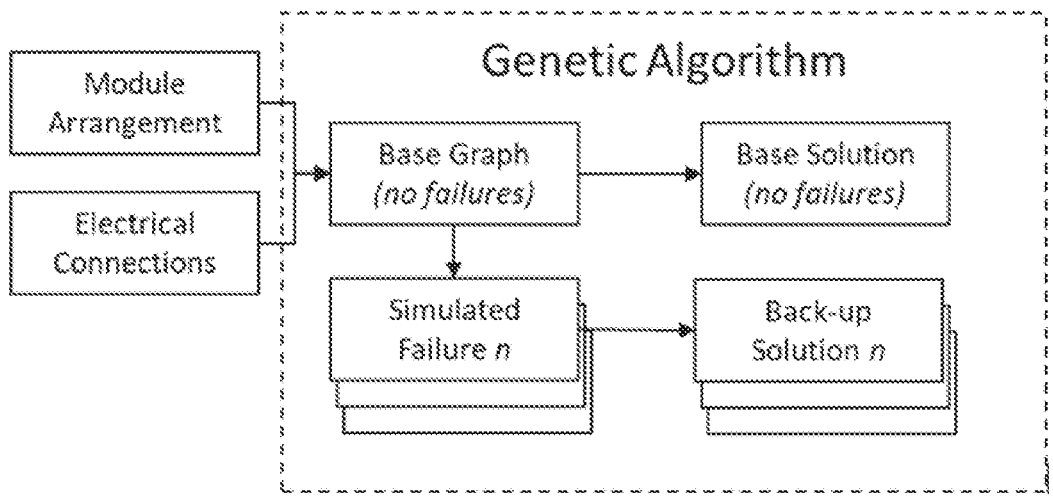
FIG. 7(a) is a flow diagram for base routing path and back-up routing path determination prior to failure.

FIG. 7(a) is a flowchart of operations prior to launch to develop the base routing path and back-up routing paths for all single point failures possible in the system architecture. The arrangement of modules and connections between said modules make up the system architecture that is used to develop the base graph. The base graph is a directed graph that s the abstract representation of the connections system architecture. The genetic algorithm takes the directed graph of the system architecture in the absence of failure and returns a directed acyclic graph that is equivalent to a RL routing path. This RL routing path is inverted to produce the FL routing path and both are adopted as the means by which modules actively communicate RL and FL data prior to occurrences of failure.

Simulated failures are modifications of the system architecture to either simulate the removal of nodes (modules) or edges (electrical connections) from the base graph. Each potential single failure point represents a new modified system architecture. The genetic algorithm is used to solve for a new routing path for each of the new modified system architectures unless a previously solved routing path still remains valid for the new modified system architecture. These new routing paths are referred to as back-up solutions and shall be adopted in the event of a single point failure corresponding to the simulated failure used to create the back-up solution.

Figure 7B:
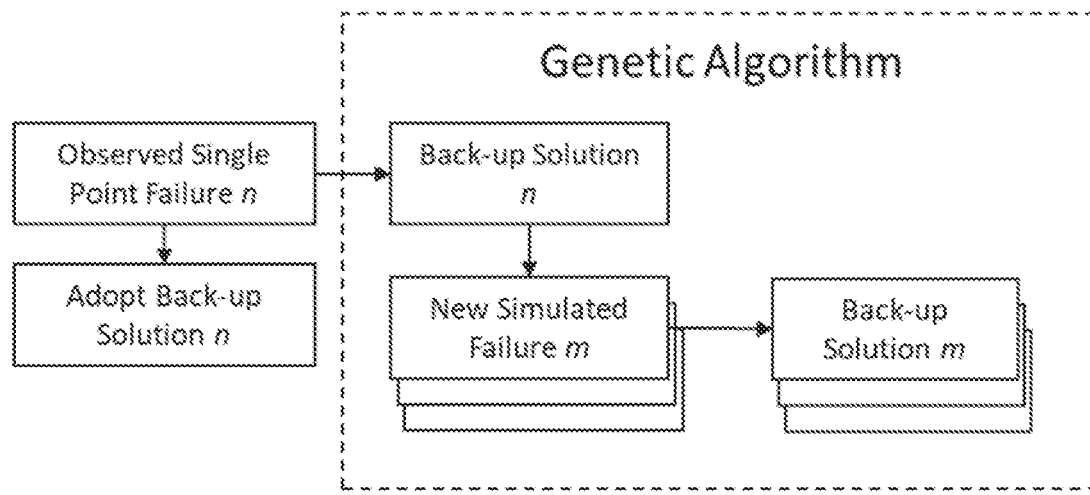
FIG. 7(b) is a flow diagram for new back-up routing path determination in response to a single point failure event.

FIG. 7(b) is a flowchart of operations if a single point failure is observed during operation. In the event of a single point failure, the back-up solution routing path that had been previously solved for by the genetic algorithm corresponding to the observed failure point is adopted. However, the remaining back-up solutions in the previous solved set may now be invalidated by the presence of the observed failure. This means that a new set of simulated failures must be run through the genetic algorithm. The new set of back-up solutions is generated using the observed failure as well as each remaining potential single point failure. If a subsequent single point failure occurs, the corresponding back-up solution can then be adopted, providing a routing path of maximum fitness, considering each observed failure.

Suspected failures are determined by the control satellite 200 or a common module 20 when a module or multiple modules 20 are found to be inoperable, lacking in responsiveness, or improperly communicating. The control satellite (or ground station, if the back-up solutions are saved on the ground) then cross-references the suspected failure point against the list of back-up solutions. The control satellite then commands each module to adopt the back-up solution corresponding with the suspected failure. The back-up solution is implemented by sending a command from the control satellite by means of the low-speed connection to each module.

In one embodiment of the disclosure, this command may contain the entire back-up routing path to be adopted. The back-up routing path being a data set composed of a number of data packets equivalent to the number of modules. Each data packet containing a module ID tag and four values, each value corresponding to a mode of operating its high-speed connectors. The operating modes for the high-speed connectors are 1) inactive, 2) receiving RL data and sending FL data, or 3) sending RL data and receiving FL data.

In another embodiment of the disclosure, this command contains only a reference as to which back-up routing path shall be adopted, each back-up routing path being stored locally in the memory of each module. The back-up routing path being as previously described.

Figure 7C:
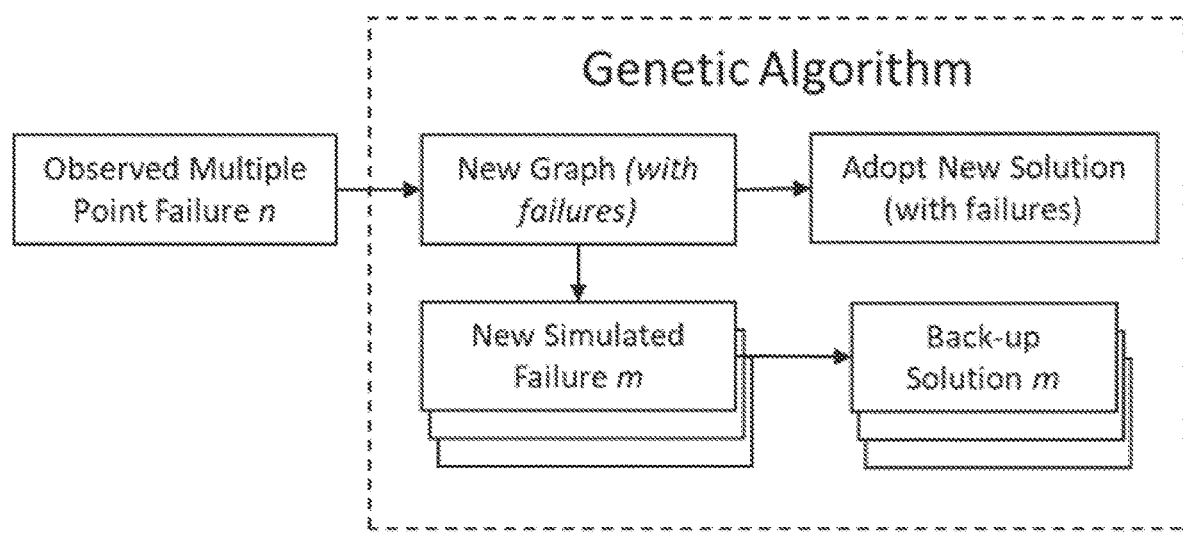
FIG. 7(c) is a flow diagram for new primary and back-up routing path determination in response to a multiple point failure event.

FIG. 7(c) is a flowchart of operations if a multiple point failure is observed during operation. In the event of a multiple point failure, there may be no saved back-up solution of a routing path that is applicable to the system architecture including these multiple point failures. The detected failures are passed through the control satellite to a ground station and used to create a directed graph representing the modified system architecture that takes into account the detected failures. The genetic algorithm takes this directed graph and uses it to solve for a new applicable routing path. This new routing path is immediately relayed to the control satellite, relayed to each module, and then adopted. As before, any previous back-up solutions may have now been invalidated and a new set of back-up solutions is created using the genetic algorithm based on any further simulated single point failure.

In the embodiments shown, the small satellites 302 and/or the central satellite 200 can include a processing device to perform various functions and operations in accordance with the present disclosure. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data can be stored on or read from the storage device. The processing device can execute software that can be stored on the storage device. Unless indicated otherwise, the process is preferably implemented in automatically by the processor substantially in real time without delay.

When the modules 200, 20 are configured as an array of a plurality of antenna assemblies, it (e.g., the antennas 28) communicates with processing devices on Earth, such as for example a user device (e.g., cell phone, tablet, computer) and/or a ground station. The present disclosure also includes the method of utilizing the modules 20 to communicate with (i.e., transmit and/or receive signals to and/or from) processing devices on Earth. The present disclosure also includes the method of processing devices on Earth communicating with (i.e., transmit and/or receive signals to and/or from) the modules 20. In addition, the module 20 is used in Low Earth Orbit (LEO), or in other orbits or for other applications. Still further, while the system has been described as for an array of antenna assemblies, the system can be utilized for other applications, such as for example data centers, reflectors, and other structures, both implemented in space or terrestrially.

It is noted that the FL and RL routing paths have been described and shown as involving the same modules 20 to form the same path (albeit in opposite directions). However, in another embodiment, the FL and RL routing paths can involve different modules 20 to form different paths and/or different modules 20. For example, for Module 5 in FIG. 4(a), the FL routing path can be from Module 1 to Module 4 to Module 5, and the RL routing path can be from Module 5 to Module 4 to Module 3, to Module 2, to Module 1.

It is further noted that the system is shown and described as having a control satellite 200, which in some embodiments is separate and distinct from the common satellites 20. In other embodiments, the system can be a distributed network without a control satellite, but with shared or distributed processing. In still further embodiments, the control satellite 200 can be integral with the common satellites 20.

Accordingly, observed failures at the common modules are relayed to the control module processor and the control module processor then makes the decision to move to the new routing path. That decision is then relayed to all the common modules processors, which then adopt said routing path. In another embodiment, the common module that observes the failure can make the decision to move to the new routing path. That common module can store a routing path that accommodates the observed failure previously sent to said common module or if the common module can solve for a new routing path itself.

In yet another embodiment of the present disclosure, data (such as network configuration and observed failures) can be transmitted from the satellites 302 and/or 200 (e.g., by processing devices 30 and/or 230) to a ground station. The ground station processing device can then determine the appropriate routing path and transmit a control signal to the satellites 302 and/or 200 (e.g., to the processing devices 30 and/or 230) to control the routing path.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

Additionally, where a method described above or a method claim below does not explicitly require an order to be followed or an order is otherwise not required based on the description or claim language, it is not intended that any particular order be inferred. Likewise, where a method claim below does not explicitly recite an order mentioned in the description above, it should not be assumed that the order is required by the claim.

The invention claimed is:

1. A satellite module comprising:
an antenna;
a high-speed return link input for receiving return link data from a first adjacent satellite module connected to the satellite module by at least one wire;
a high-speed return link output for transmitting return link data to a second adjacent satellite module connected to the satellite module by at least one wire; and
a low-speed link for transmitting and receiving routing path commands when said high-speed return link input fails to receive return link data and/or said high-speed return link output fails to transmit return link data,
wherein the satellite module is connected to a control satellite module via the first adjacent satellite module, the second adjacent satellite module, or both, via a routing path;
wherein the satellite module, the first adjacent satellite module, the second adjacent satellite module, and the control satellite module are within a phased array of satellite modules, wherein the routing path allows the satellite module, the first adjacent satellite module and the second adjacent satellite module to communicate with the control satellite and wherein the routing path is updated when an active connection within the phased array fails.

2. The satellite module of claim 1, further comprising:
a high-speed forward link input for receiving forward link data;
a high-speed forward link output for transmitting forward link data; and
the low-speed link transmitting and receiving commands when said high-speed forward link input fails to receive forward link data and/or said high-speed forward link output fails to transmit forward link data.

3. The satellite module of claim 1, further comprising a processing device for receiving return link data on said high-speed return link input, aggregating the received return link data with return link data from said satellite module antennas, and transmitting the aggregated return link data on said high-speed return link output.

4. The satellite module of claim 2, said processing device receiving forward link data on said high-speed forward link input, transmitting the received forward link data over its antennas, and transmitting a copy of the received forward link data on said high-speed forward link output.

5. A satellite module comprising:
an antenna;
a plurality of high-speed return link inputs each for receiving return link data from a first adjacent satellite module that is connected to the satellite module through at least one wire;
a plurality of high-speed return link outputs each for transmitting return link data to a second adjacent satellite module or a control satellite module that is connected to the satellite module by at least one wire;
a plurality of high-speed forward link inputs each for receiving forward link data from the second adjacent satellite module or the control satellite module;
a plurality of high-speed forward link outputs each for transmitting forward link data to the first adjacent satellite module;
a low-speed link for transmitting and receiving routing path commands; and
a processing device determining if one of said plurality of high-speed return link inputs, said plurality of high-speed return link outputs, said plurality of high-speed forward link inputs, said plurality of high-speed forward link outputs, fails; and based on that determination, communicating forward link data and/or return link data over the low-speed link,
wherein the satellite module is connected to the control satellite module via the first adjacent satellite module, the second adjacent satellite module, or both, via a routing path;
wherein the satellite module, the first adjacent satellite module, the second adjacent satellite module, and the control satellite module are within a phased array of satellite modules, wherein the routing path allows the satellite module, the first adjacent satellite module and the second adjacent satellite module to communicate with the control satellite and wherein the routing path is updated when an active connection within the phased array fails.

6. The satellite module of claim 5, further comprising a low-speed link reporting receiving a return link routing path and a forward link routing path and/or reporting a failure to a control satellite.

7. The satellite module of claim 5, wherein said processing device determination is based on a return link routing path and a forward link routing path received from a control satellite.

8. The satellite module of claim 5, said processing device receiving return link data on one or two of said plurality of high-speed return link inputs, aggregating the received return link data with return link data from said satellite module, and transmitting the aggregated return link data on one of said plurality of high-speed return link output.

9. The satellite module of claim 5, said processing device receiving forward link data on said high-speed forward link input, sending the received forward link data over said antenna, and transmitting copies of the received forward link data on one or two said high-speed forward link outputs.

10. The satellite module of claim 5, wherein said processing device determines which one of said plurality of high-speed return link inputs, said plurality of high-speed return link outputs, said plurality of high-speed forward link inputs, and said plurality of high-speed forward link outputs to communicate over based on a routing path.

11. The satellite module of claim 1, wherein the first adjacent satellite module communicates with the satellite module through at least one wire.

12. The satellite module of claim 1, wherein the first adjacent satellite module is physically connected to the satellite module.

13. The satellite module of claim 5, wherein the first adjacent satellite module communicates with the satellite module through at least one wire.

14. The satellite module of claim 5, wherein the first adjacent satellite module is physically connected to the satellite module.

* * * * *